US005852868A

United States Patent [19]

Soriano

[11] Patent Number: 5,852,868

[45] Date of Patent: Dec. 29, 1998

[54] MACHINE INCLUDING A PLURALITY OF CRIMPING STATIONS FOR PREPARING ELECTRICAL HARNESSES

[75] Inventor: Louis Soriano, Aubagne, France

[73] Assignee: The Whitaker Corporation, Wilmington, Del.

[21] Appl. No.: 776,163

[22] PCT Filed: Aug. 3, 1995

[86] PCT No.: PCT/IB95/00606

§ 371 Date: Jan. 23, 1997

§ 102(e) Date: Jan. 23, 1997

[87] PCT Pub. No.: WO96/04699

PCT Pub. Date: Feb. 15, 1996

[30] Foreign Application Priority Data

Aug. 5, 1994 [FR] France .................................. 94 09967

[51] Int. Cl.[6] ............................ H01R 43/04; B23P 19/02

[52] U.S. Cl. ............................ 29/753; 29/33 M; 29/755; 29/861; 72/442; 72/453.07

[58] Field of Search .................................. 29/33 M, 755, 29/753, 861, 862, 863; 72/453.07, 442, 184, 190, 481

[56] References Cited

U.S. PATENT DOCUMENTS

| | | | |
|---|---|---|---|
| 4,375,229 | 3/1983 | Mikami et al. | 29/753 |
| 4,527,414 | 7/1985 | Jurkovic et al. | 29/237 X |
| 4,581,796 | 4/1986 | Fukuda et al. | 29/33 M |
| 4,611,484 | 9/1986 | Mackissinger, Jr. et al. | 72/481 |
| 4,715,099 | 12/1987 | Yoshida | 29/33 M |
| 4,831,861 | 5/1989 | Hofmann et al. | 29/453.07 X |
| 4,835,855 | 6/1989 | Eaton et al. | 29/861 X |
| 4,896,419 | 1/1990 | Jurgenhake et al. | 29/861 |
| 5,127,159 | 7/1992 | Kudo et al. | 29/753 X |
| 5,152,162 | 10/1992 | Ferraro et al. | 29/720 X |
| 5,208,977 | 5/1993 | Ricard | 29/861 |
| 5,210,942 | 5/1993 | Emmerich et al. | 29/863 |
| 5,323,528 | 6/1994 | Baker | 29/740 X |
| 5,456,005 | 10/1995 | Satoh et al. | 29/863 |
| 5,491,994 | 2/1996 | Baldyga | 29/753 X |

FOREIGN PATENT DOCUMENTS

| | | | |
|---|---|---|---|
| 0 036 240-A1 | 9/1981 | European Pat. Off. | H01R 43/04 |
| 0 459 476-A2 | 12/1991 | European Pat. Off. | H01R 43/04 |
| 2 555 397-A1 | 5/1985 | France | H05K 13/06 |
| 2 514 144-A1 | 10/1988 | France | H01R 43/048 |
| 0889254 | 12/1981 | U.S.S.R. | 72/453.07 |

OTHER PUBLICATIONS

PCT International Search Report (see PCT Publication).

*Primary Examiner*—Peter Vo
*Assistant Examiner*—Rick Kiltae Chang
*Attorney, Agent, or Firm*—Driscoll A. Nina

[57] ABSTRACT

The present invention relates to a machine for preparing or making electrical harnesses. The machine includes a plurality of crimping stations situated along a horizontal linear conveyor (5) that moves clamps (6) holding lengths of wire (28). Each crimping device includes a tool (1) that is fed with terminals (50) from a reel (3). The tool (1) includes a fixed matrix (9, 10) and a moving punch (12, 13). The machine includes a press (4) that is movable in translation relative to the crimping tool in a direction parallel to the conveyor. The crimping tool includes means for holding the punch in a high position and the machine includes a servo-controlled actuator for driving the moving press. The technical field of the invention is that of manufacturing electrical harnesses.

10 Claims, 3 Drawing Sheets

MACHINE INCLUDING A PLURALITY OF CRIMPING STATIONS FOR PREPARING ELECTRICAL HARNESSES

BACKGROUND OF THE INVENTION

1. Field of the Invention

The present invention relates to a machine for preparing or fabricating electrical harnesses for fitting to motor vehicles or domestic appliances, for example.

The technical field of the invention is that of manufacturing electrical harnesses.

2. Summary of the Prior Art

Various types of machine are already known for preparing or fabricating electrical harnesses, which machines include a plurality of modules for crimping terminals on previously-stripped ends of lengths of wire.

U.S. Pat. No. 4,375,229 (Mikami et al.) describes a machine for preparing lengths of electrically conductive wire and that is controlled by an automatic control device. That machine includes a plurality of modules disposed on a first side of a conveyor, with lengths of electric wire in the form of loops being displaced by the conveyor on a second side thereof. The machine comprises, disposed in succession along the conveyor: an electric wire feed device; a wire cutting device to form lengths of electric wire; a device for looping back one end of each length so that the lengths form loops, with both ends of each length being held by clamps that are displaced by the conveyor; downstream from those first elements, the machine includes devices for stripping the ends of the lengths of wire; a sensor for monitoring stripping; and then a plurality of devices or presses for crimping terminals onto the ends of the lengths of wire being displaced by the conveyor.

Similar machines are also known in which two parallel conveyors are provided, each length of wire being held in the vicinity of each of its two ends by a clamp located on a respective one of the two conveyors, the central portion of the wire hanging freely (under its own weight) in a loop between the two conveyors, e.g. as described in European patent application EP 7 681 (Utilux).

The present invention consists in an improvement in machines of those types for preparing lengths of wire for fabricating electrical harnesses.

The advantage of the machine described in the above-referenced Mikami patent and resulting from the presence of a plurality of crimping stations disposed along the conveyor is that it enables different types of terminal to be crimped onto the lengths of wire being displaced by the conveyor without it being necessary to stop the machine to replace crimping tools (or a portion of a crimping tool sometimes known as a “applicator”), given that each tool is specifically adapted to a determined type of terminal and needs replacing by other tools adapted to terminals of other types.

The use of an automatic machine of that type is particularly advantageous when the machine is used on a continuous basis, and is given characteristics that enable it to manufacture different lengths of wire, fitted with different terminals, for making up various types of electrical harness.

It can thus be necessary to multiply the number of crimping stations located along the conveyor, and that can give rise to machines for preparing lengths of wire that are very bulky and very expensive.

The problem posed consists in obtaining machines for preparing lengths of wire fitted with terminals for fabricating electrical harnesses, and enabling terminals of several different types to be crimped onto the lengths of wire, while limiting the size of such machines and also their cost.

SUMMARY OF THE INVENTION

The solution to the problem posed consists in providing a machine for preparing (or fabricating) electrical harnesses and including a plurality of devices (or stations) for crimping terminals onto the stripped ends of lengths of electrically conductive wire, in which said crimping stations are situated along a horizontal linear conveyor that moves clamps holding the ends of lengths of wire; each of said crimping devices essentially includes a tool that is fed with terminals taken from a strip wound on a reel, which tool includes a fixed matrix and a punch that is movable, e.g. vertically; and said machine for manufacturing electrical harnesses includes a press that is movable in translation parallel to said conveyor in such a manner as to take up a position facing one of said crimping tools and then to actuate said crimping tool by displacing its punch. The crimping tool may include (indexing or return) means for holding the moving punch in a high (or disengaged) position. The machine may further include an actuator for driving said moving press in translation, which actuator is servo-controlled and enables the moving press to be brought into coincidence with any one of said crimping stations. The moving press may include a moving member (or slide) for transmitting force and that is of a shape which is complementary to the shape of the moving punch (or the support for the moving punch) enabling the press to actuate the clamping tool when in coincidence therewith.

In a preferred embodiment the moving press is driven by a motor (which may be mechanical, electrical, hydraulic, or pneumatic) which is controlled by a central unit, via for example a lead screw rotatably co-operating with a nut that is mechanically associated with said press;

said moving press is fitted with an actuator that is hydraulic and/or pneumatic;

said hydraulic or hydropneumatic actuator acts directly (via its rod) on said crimping tool, i.e. without interposing a device for transforming movement from the actuator rod (such as a force multiplier device) or a device for redirecting or modifying the direction of the force exerted by the actuator rod;

each of said fixed crimping tools includes a spring for returning said punch to its high (or disengaged) position;

said machine includes a plurality of crimping tools that are preferably substantially regularly spaced at a pitch of less than 200 millimeters, and includes means for displacing said moving press suitable for causing said press to move at a linear speed of not less than 0.3 meters per second (m/s), e.g. of the order of 0.5 m/s to 1 m/s;

said moving press includes a sensor for measuring the crimping force, e.g. a piezoelectric sensor integrated in said moving press, e.g. in a yoke provided at the end of the actuator rod of said press;

a sensor for sensing the position of the moving member for applying the force of the press (the rod of a hydraulic or hydropneumatic actuator) is integrated in said moving press in order to measure the displacement of the moving punch with which the moving press coincides in order to deduce the crimping stroke;

said moving press slides (or runs on wheels) on one or more rails parallel to the longitudinal axis XX of the conveyor, which rails are mounted on the framework of said machine via spacers that are substantially regularly spaced apart, e.g. at a pitch that is a multiple of the spacing of said crimping tools;

said machine includes at least two moving presses on at least two common rails, and includes two independent drive systems for moving said moving presses in translation, and includes two servo-controlled electric motors for driving said moving presses;

said machine includes a controller (an electronic monitoring and control device) associated with each moving press, and preferably connected to a central control unit for the various modules of said machine, said controller controlling electrically controlled valves for sequential feed of hydraulic fluid to the actuator of said moving press; and said crimping stations (or devices) are situated along (a first side of) a horizontal (rectilinear) linear conveyor, e.g. having a belt or a chain, which conveyor moves pairs of adjacent clamps holding lengths of wire in the form of loops, the clamps holding the lengths of wire in the vicinity of their two ends so as to move said ends of the lengths of wire successively past said crimping devices; said clamps hold the previously stripped ends of the lengths of wire that are in the form of loops so that the ends point towards the side of the conveyor where the crimping stations are situated, and so that they extend perpendicularly to the axis of the conveyor and preferably along an axis that is substantially horizontal.

Because of the characteristic of the invention whereby the machine includes a moving press that moves so as to actuate one of the permanently installed (fixed) crimping tools on the table or framework of the machine, as a function of commands applied to the displacement means and commands applied to the moving press itself via controllers (electronic monitoring and control devices, and optionally under the supervision of a central control and monitoring unit for the various modules of the machine), it is possible to obtain a machine that is of small size because the size of the various crimping tools disposed along the conveyor is much smaller than the size of traditional crimping presses that include not only the tool but also the device for applying force on the tool, which device is generally rather bulky, whether the device is mechanical or pneumatic or otherwise.

It is thus possible to reduce the pitch (measured in a direction parallel to the longitudinal axis of the conveyor) from a value that is generally of the order of 300 millimeters or more to a pitch that is of the order of about 100 millimeters.

The cost of a machine of the invention is considerably reduced in that a single crimping tool actuator device (or crimping press) is provided to actuate a plurality of tools, thereby achieving savings; the additional mechanism for displacing the moving press and the corresponding cost is less than the cost of additional presses (conventionally provided at one press per tool) once each moving press is used in association with at least three tools; a moving press is preferably provided to actuate five to 20 tools located on the framework of the machine.

In a machine of the invention, it is advantageous to use moving presses fitted with a hydraulic or pneumatic actuator in order to reduce the weight of the moving press and thus make it possible to increase its displacement speed without requiring a press drive system that is itself too bulky; moving presses obtained using hydraulic or pneumatic actuators are lighter in weight than mechanical presses e.g. of the kind described in U.S. Pat. No. 4,611,484 (MacKinssinger et al.).

It is also particularly advantageous to use a press fitted with an actuator whose rod directly actuates the crimping tool, as compared with crimping presses fitted with actuators such as those described in British patent 1 376 877 (George William Rider) in which the press includes a device for transforming the movement of the actuator rod so as to multiply or modify the force exerted by the rod for exerting a force on the punch, and also a device for modifying the direction in which the force is applied; it is thus particularly advantageous for the movement of the actuator to be at least parallel with if not directly in line with the direction of movement of the crimping punch.

The numerous advantages provided by the invention will be better understood from the following description which refers to the accompanying drawings showing, without any limiting character, various embodiments of the machine of the invention.

DETAILED DESCRIPTION OF THE PREFERRED EMBODIMENT

Figure 1:
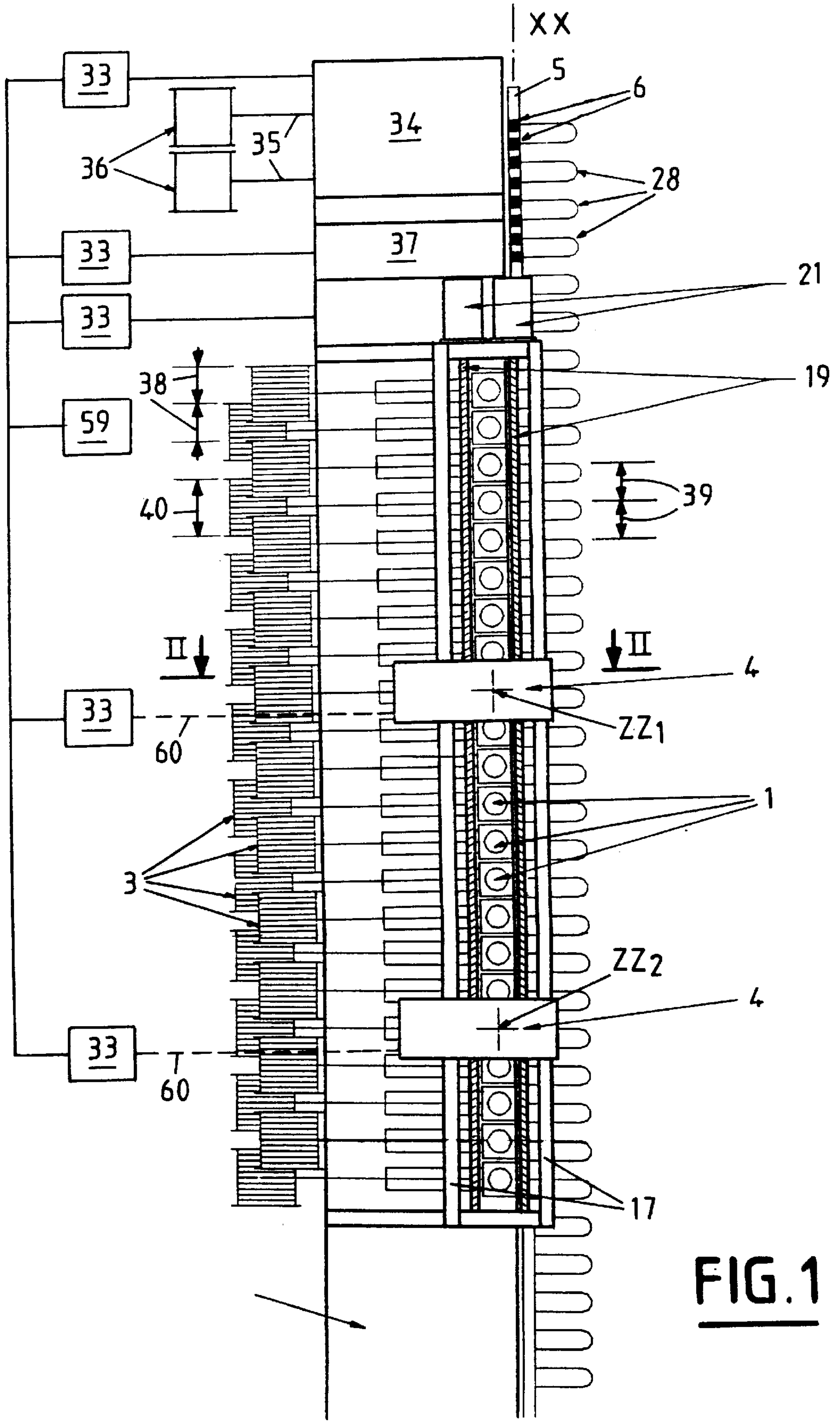
FIG. 1 is a diagrammatic plan view showing the main components of a machine for preparing lengths of wire for making up electrical harnesses.

As shown in FIG. 1, the machine for preparing lengths of wire comprises a linear or rectilinear conveyor 5 extending along a longitudinal axis XX that is preferably horizontal; the conveyor may be an endless belt or a chain, and it is fitted with clamps 6 for holding lengths of wire 28 disposed in loops, each length of wire being held in the vicinity of each of its two ends; thus, two adjacent clamps 6 in successive positions on the conveyor 5 hold the two ends of a length of wire 28 that forms a loop, the two ends being situated on a first side of the conveyor 5 and the loop (i.e. the central portion of the length of wire) being situated on a second side of the conveyor.

On the first side of the conveyor, i.e. the side where the ends of the length of wire are situated, the following are provided in succession and in conventional manner: a device 34 for preparing lengths of wire from an electrically conductive wire 35 that is paid out from a wire storage reel 36.

Thereafter (with reference to the direction in which lengths of wire are displaced along the machine by the conveyor 5), the machine includes a device 37 for stripping the ends of the lengths of wire.

In accordance with the invention, the machine then includes a plurality of crimping tools 1 disposed along the conveyor 5 and always on the same side thereof, i.e. on the side where the ends of the lengths of wire are situated, which tools 1 are regularly spaced apart at a small pitch 39, e.g. of about 100 mm.

Figure 2:
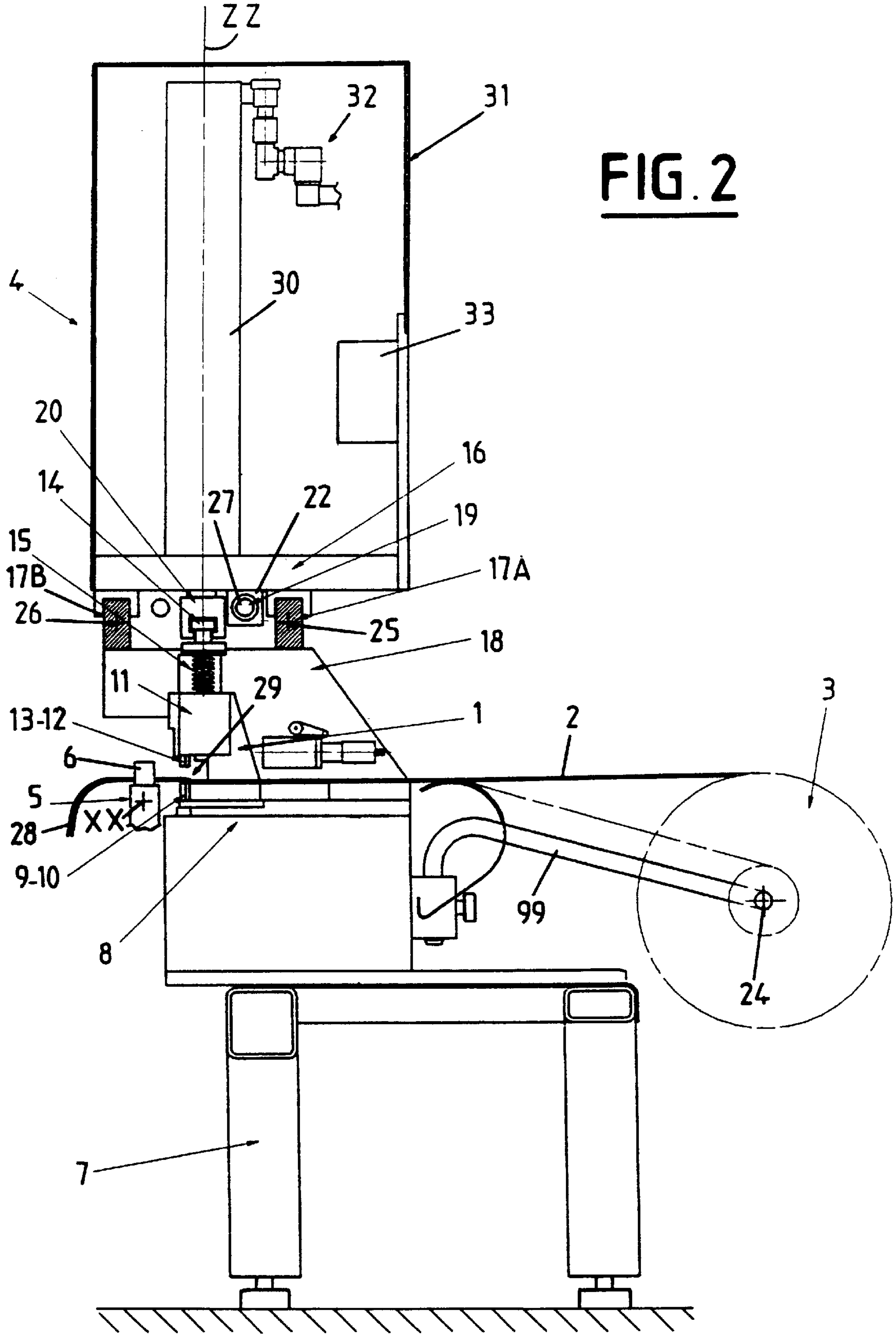
FIG. 2 is a section view on a plane perpendicular to the longitudinal axis of the conveyor, showing a moving press fitted to a machine of the invention for preparing lengths of wire.

Each of the crimping tools 1 may be fed with crimping terminals by a respective reel 3 situated behind the machine (to the left in FIG. 1); said terminals are packaged so as to constitute a strip that is wound onto the reel 3, as can also be seen in FIG. 2.

When the length 40 of the reels 3 as measured in a direction parallel to the longitudinal axis XX of the conveyor is greater than the pitch 39 at which the crimping tools are spaced apart, the reels may be disposed in a staggered configuration (as shown in FIG. 1), i.e. two successive reels have their respective axes (referenced 24 in FIG. 2) offset vertically, so that the pitch 38 between two successive reels 3 is equal to the pitch 39 separating two tools 1, in spite of the fact that the width 40 is greater than said spacing pitch.

As shown in FIG. 1, the machine includes two rolling or sliding rails 17 on which two moving presses 4 can roll or slide so as to move along the rails, i.e. parallel to the longitudinal axis XX of the conveyor 5.

As shown particularly in FIG. 2, each moving press 5 may be fitted at its bottom end with a nut 22 suitable for co-operating with a lead screw 19 extending parallel to said longitudinal axis XX of the conveyor; said screw 19 may be driven by an electric motor 21 servo-controlled by a controller 33 to cause the moving press 4 to move in a direction parallel to said axis XX, thereby bringing it level with one of the crimping tools 1 in order to perform the operation of crimping a terminal of a predetermined type onto an end of a length of wire.

The various terminal feed reels 3 shown in FIG. 1 preferably receive terminals of different respective types.

As shown in FIG. 1, each moving press may be controlled by a controller 33 connected by a cable 60 to the press in the event of the controller being fixed and the press being moving; or else the controller may be integrated in the moving press, as shown in FIG. 2.

The controllers 33 for monitoring and controlling each module of the machine may all be connected to a central control unit 59 as also shown in FIG. 1.

With reference to FIG. 2, it can be seen that in accordance with the invention a base 8 receiving a wire end termination tool 1 is disposed on the framework 7 of the machine for preparing lengths of wire. The wire end termination tool is for attaching terminals to leads, for example electrical terminals to ends of the lengths of wire 28. In the embodiment described, the tool 1 is a crimping tool. The bottom portion of each crimping tool essentially includes anvils (or matrices) 9 and 10 adapted respectively to the profile of the insulation and to the profile of the stripped portion of the end 29 of each length of wire 28 (where the lengths are themselves held in the vicinity of said ends by clamps 6 displaced by the conveyor 5 along the longitudinal axis XX which is perpendicular to the plane of FIG. 2).

Terminals for crimping onto said ends of the lengths of wire are packaged in the form of a strip 2 wound or rolled up on a reel 3 having an axis of rotation 24 and held by a support 29 connected to the framework 7 of the machine.

The tool 1 also includes an essential portion constituted by punches 12 and 13 respectively adapted to the matrices or anvils 9 or 10, which punches are carried by a punch carrier 11 that is vertically movable, i.e. along an axis ZZ; the tool 1 is permanently mounted on the framework 7 via the base 8 and in a machine of the invention it includes a return spring 15 urging it to a disengaged position, i.e. a high position for the punches 12 and 13 so that when a punch is not actuated by the moving crimping press, the ends 29 of the lengths of wire are disengaged and those lengths of wire which are not to be crimped by the tool in question are free to move between the punch and the matrix.

The crimping tool 1 of a machine of the invention also includes a nose (or adapter) 14 disposed at the top of the tool, mechanically linked to the punch and serving as an interface between the tool and the free end of the actuator rod of a hydropneumatic actuator 30 provided in the moving press 4.

The actuator rod situated at the bottom of the actuator and movable along the vertical axis ZZ relative to the body of the actuator thus includes a yoke 20 (or temporary link or adapter) of profile complementary to the profile of the nose 14 and thus suitable for engaging therein so that when the moving press 4 is disposed facing the tool 1 it is possible to transmit drive from the actuator rod 30 to the punches 12 and 13 via said nose 14 and said punch carrier 11; engagement is ensured firstly by the complementary shapes of the yoke and the nose, and secondly by the moving punch being returned or indexed into the disengaged position.

As shown in FIG. 2, the moving press 4 comprises a housing (or cover or box) 31 mounted on a moving carriage 16 and containing said hydropneumatic actuator 30 fitted with electrically controlled valves 32 for feeding it with fluid, and as illustrated in the figure it may also include a controller 33 or sequencer apparatus for monitoring and controlling the operation of said press.

As shown in this figure, it can be seen that the carriage 16 that forms a part of the moving press 4 is fitted at its bottom end with shoes or bearings 23 suitable for sliding or rolling on rails 17A and 17B that are securely and rigidly fixed to the framework 7 via spacers 18 that serve to support said rails.

Said rails 17A and 17B extend along respective axes 25 and 26 parallel to the longitudinal axis XX of the conveyor 5.

A lead screw 19 is also provided, having its longitudinal axis 27 parallel to said axes 25, 26, and XX, and suitable for co-operating with a nut 22 fixed beneath the bottom face of the carriage 16 so that rotation of the lead screw 19 about its axis 27 causes said moving press 4 to be driven along said axis 27, thereby enabling it to be positioned facing a crimping tool 1 that it is to actuate.

Figure 3:
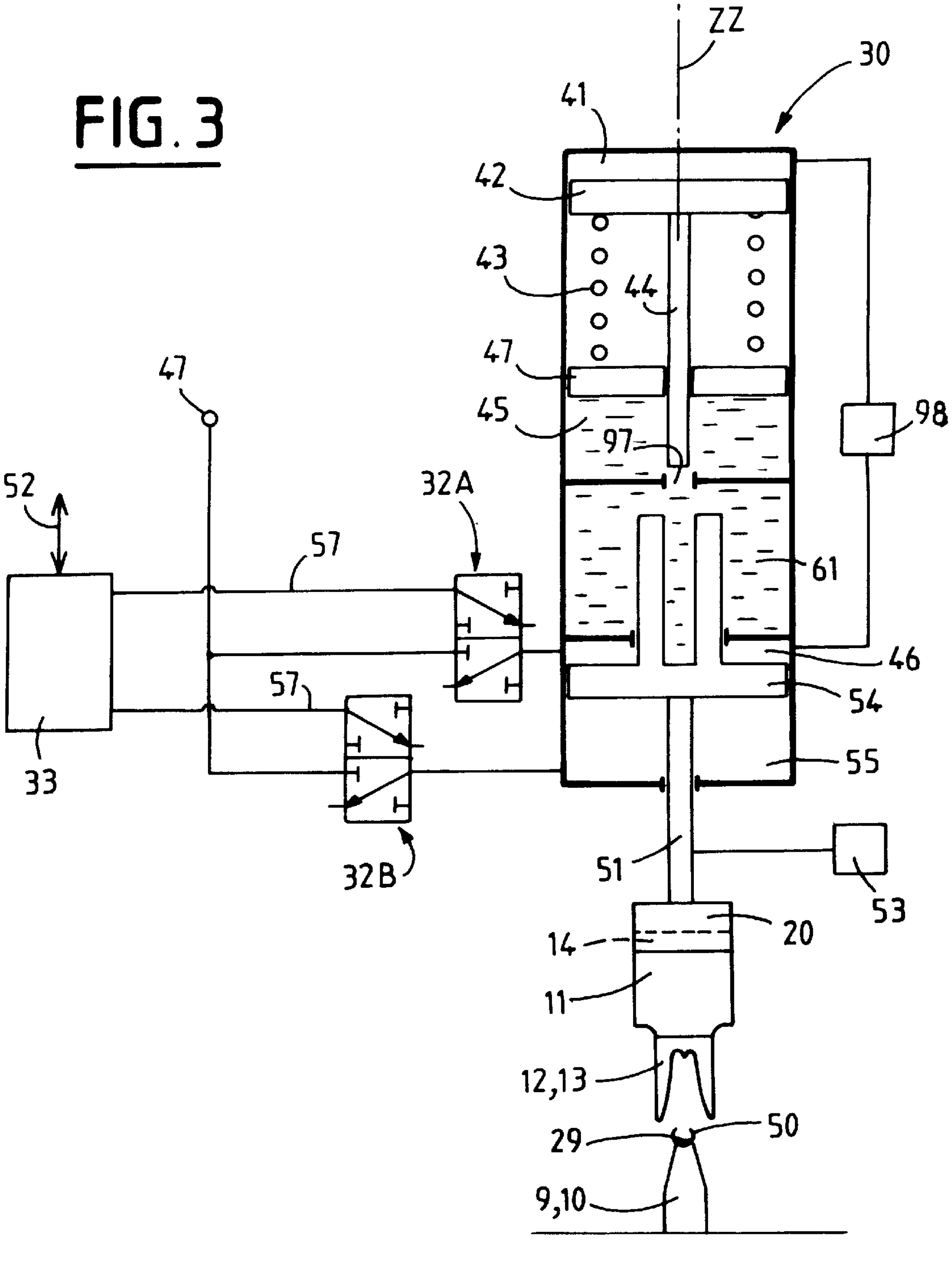
FIG. 3 is a diagram of a hydropneumatic actuator for actuating a moving press of the invention, together with control and monitoring devices therefor.

With reference to FIG. 3, it can be seen that a moving press of the invention includes an actuator of the hydraulic cylinder type 30 enabling actuation of the tool punch to be controlled, which actuator is provided with a power supply circuit delivering pneumatic energy from a source 47 provided by feed at constant pressure and at controlled flow rate for the hydraulic or hydropneumatic actuator.

A sequencer or controller 33 serves to control the feed of hydraulic fluid to the actuator 30 in such a manner as to generate a force on the tool (punch) against the terminal to be crimped, in application of a determined working cycle (i.e. displacement along the axis ZZ).

By way of example, the hydropneumatic actuator 30 may be an actuator manufactured by the German company PRESSO TECHNIK GmbH, and sold in France by DIMA FLUID of 92600 Asnis.

A crimping force sensor, e.g. of the piezoelectric type, may be integrated in the yoke mounted at the end of the actuator rod of the moving press; this sensor is mounted substantially flush and comes into contact with a face of the nose of the punch carrier of the crimping tool when the moving press coincides with said tool, so that the crimping force exerted by the press on the crimping tool as transmitted to said nose by said yoke is measured by the sensor.

The actuator 30 is fed by electrically controlled valves 32A and 32B which are connected to a source of compressed air 47, and which enable the compressed air to be delivered respectively to chambers 46 and 55 on either side of a piston 54, or else to connect said chambers to exhaust, as a function of control signals issued by the controller 33 via electrical connections 57.

Operation is as follows:

the drive valves 32A and 32B are actuated so that compressed air penetrates into the chamber 46 while chamber 55 is connected to exhaust; and the piston 54 then moves at high speed while developing a low force until contact is made with the terminal to be crimped.

The reaction from the terminal to be crimped causes a sequencer valve 98 to be triggered (i.e. opened); compressed air then passes from the chamber 46 to the chamber 41; the amplifier piston 42 then causes its plunger 44 to penetrate through the high pressure seal 97 separating the high pressure chamber 61 from the oil compensator 45 and providing sealing up to a pressure of about 400 bars, for example; this high pressure of oil that obtains in the chamber 61 acts on the high pressure face of the piston 54 and urges it downwards over a stroke that may be as much as 24 mm, for example.

Crimping is thus performed, after which the control valves 32A and 32B are actuated again and the sequencer valve 98 automatically connects to exhaust as does the chamber 41; the piston 54 and the amplifier piston 42 then return to the starting position (high position).

It can also be seen in this figure that the rod 51 of the actuator is linked directly to the punch carrier 11 via a yoke 20 suitable for co-operating in an engageable nose 14 provided at the top of the tool carrier 11 which receives the punches 12 and 13 for crimping a terminal 50 on the end 29 of a previously stripped length of electric wire, a fixed anvil 9, 10 also being provided in conventional manner.

The figure also shows a sensor 53 for monitoring the position of the actuator rod 51 and connected to the controller 33 for controlling operation of the actuator 30 of the moving press.

I claim:

1. A machine for preparing electrical harnesses, comprising a plurality of wire end termination stations situated along a horizontal linear conveyor that displaces clamps holding lengths of wire, each of the termination stations comprising a crimping tool fed with terminals from a reel, said tool including a fixed matrix and a moving punch, said machine further comprising a press that is movable in translation relative to the crimping tool in a direction parallel to said conveyor, said crimping tool having means for holding the moving punch in a high position, said machine further comprising an actuator for moving said press in translation, said press including a moving member for transmitting crimping force to the moving punch.

2. The machine according to claim 1, wherein said press includes a sensor for measuring the crimping force, the sensor being integrated in said press.

3. The machine according to claim 1, wherein a sensor is integrated in said press for sensing a position of the moving member for applying force.

4. The machine according to claim 1, wherein said press slides on at least one rail parallel to said conveyors, said rail being mounted on a framework of said machine via spacers that are substantially regularly spaced apart.

5. The machine according to claim 4, comprising at least two presses that are movable on at least two common rails, further comprising two independent drive systems for said presses and two servo-controlled electric motors for driving said presses.

6. The machine according to claim 1, wherein the clamps hold two ends of each length of wire that is in a form of a loop, the two ends pointing towards the side of the conveyor where the crimping stations are situated, and being substantially horizontal and perpendicular to the axis of the conveyor.

7. The machine according to claim 1, wherein said press is fitted with a hydraulic actuator that acts directly on said crimping tool.

8. The machine according to claim 1, wherein each said crimping tool comprises a spring returning said punch to a disengaged position.

9. The machine according to claim 1, comprising a plurality of crimping tools spaced apart at a pitch of less than 200 millimetres, and having an actuator for displacing said press at a linear speed of not less than 0.3 meters per second.

10. The machine according to claim 1, including a controller associated with each press, and connected to a central control unit for controlling the various modules of said machine, said controller controlling electrically controlled valves for feeding the actuator of said press with fluid.

* * * * *